United States Patent [19]

Vancraeynest

[11] Patent Number: 5,023,935
[45] Date of Patent: Jun. 11, 1991

[54] COMBINED MULTI-PORT TRANSMIT/RECEIVE SWITCH AND FILTER

[75] Inventor: Jan Vancraeynest, White Plains, N.Y.

[73] Assignee: Nynex Corporation, New York, N.Y.

[21] Appl. No.: 438,737

[22] Filed: Nov. 17, 1989

[51] Int. Cl.⁵ .......................... H03H 7/46; H04B 1/50
[52] U.S. Cl. ........................................ 455/80; 455/82; 455/83; 333/104; 333/110; 333/132; 333/134; 370/38
[58] Field of Search ................. 333/101, 103–105, 333/262, 110, 132, 129, 134; 455/78, 82, 83, 80; 370/38, 37, 36

[56] References Cited

U.S. PATENT DOCUMENTS

| | | | |
|---|---|---|---|
| 3,234,555 | 8/1966 | Petrilla et al. | 333/110 X |
| 3,452,299 | 6/1969 | Angel | 333/103 |
| 4,527,136 | 7/1985 | Kamiya | 333/104 |
| 4,701,724 | 10/1987 | Martin | 333/103 |
| 4,803,447 | 2/1989 | Schultz et al. | 333/103 |

Primary Examiner—Eugene R. Laroche
Assistant Examiner—Benny T. Lee
Attorney, Agent, or Firm—Douglas J. Kirk; John J. Torrente

[57] ABSTRACT

A combined switch and filter comprising coupled first and second quarter-wave transmission line sections and switching elements for providing selective coupling and filtering between ports of the switch coupled to the ends of the quarter-wave sections.

12 Claims, 1 Drawing Sheet

COMBINED MULTI-PORT TRANSMIT/RECEIVE SWITCH AND FILTER

BACKGROUND OF THE INVENTION

This invention relates to multi-port switches and, in particular, to multi-port switches which utilize transmission lines and switching elements to achieve selective coupling between the various switch ports.

In radio frequency (RF) transmission systems, it is customary to utilize some type of multi-port switch to effect coupling amongst the antenna, transmitter and receiver of the system. In certain multi-port switches used for this purpose, switching elements and transmission lines are employed to form the switch. U.S. Pat. Nos. 4,803,447 and 4,701,724 disclose switches of this type.

The '724 patent discloses a switch (FIG. 2), therein in which a quarter-wave length of transmission line is used to connect an antenna to a transmitter and to a receiver. A first PIN diode poled in the direction of the quarter-wave line is situated between a DC blocking capacitor coupled to the transmitter and a first end of the quarter-wave line. A second PIN diode poled in a direction away from the quarter-wave line is connected to a second end of the line and to ground.

The antenna of the '724 system is also connected to the first end of the quarter-wave line and to a blocking capacitor connected to the transmitter. An RF choke is responsive at a first end to a DC bias or control signal and at its second end is connected to the junction of the first PIN diode and the DC blocking capacitor coupled to the transmitter.

With this switch configuration in the '724 patent, a high signal level applied to the first end of the RF choke places both the first and second PIN diodes into conduction. The conduction of the second PIN diode, grounds the second end of the quarter-wave line, making the second end of the line appear as an open circuit to signals at its first end. The conduction of the second PIN diode also grounds the receiver. The receiver is thus decoupled from the antenna, while the transmitter is coupled to the antenna through the first PIN diode. Hence, the system is placed in a transmit mode in which signals can pass from the transmitter to the antenna.

With a low signal level applied to the first end of the RF choke, both the first and second PIN diodes are non-conductive. The transmitter is thereby decoupled by the open circuited first PIN diode from the antenna. The second end of the quarter-wave line is, furthermore, no longer grounded because the second PIN diode also appears as an open circuit. As a result, the quarter-wave line now couples the receiver to the antenna and the system is placed in the receive mode of operation.

The '724 patent also discloses a further switch configuration (FIGS. 3 and 4), therein in which a directional coupler comprised of first and second coupled quarter-wave lines is used. In this case, the first quarter-wave line of the coupler is situated between the antenna and receiver of the system. First and second PIN diodes, in turn, are connected to the first and second ends of the second quarter-wave line. The transmitter is connected to this second end of the second line and control signals are applied to the anode of the first diode to operate the switch.

In the transmission system of the '724 patent, filters are also used with the disclosed switches to filter the received and transmitted signals in a variety of ways. These filters are separate components from the switches, thereby adding both to the cost and size of the overall system.

It is therefore a primary object of the present invention to provide a multi-port switch of the above type which is adapted to reduce the cost of additional filtering components.

It is a further object of the present invention to provide a multi-port switch of the above type which is further adapted to provide filtering as well as switching.

SUMMARY OF THE INVENTION

In accordance with the principles of the present invention, the above and other objects are realized in a multi-port switch comprising first and second coupled quarter-wave transmission line sections. The first transmission line section has first and second ends which are connected to first and second switching elements, respectively.

The first switching element is connected between the first end of the first transmission line and a first port of the switch. The second switching element is connected between the second end of the first transmission line and ground. The second end of the first transmission line is further adapted to be connected to a second port of the switch.

The second quarter-wave transmission line has a first end opposite to said first end of the first quarter wave transmission line which is adapted to be connected to a third port of the switch. The second end of this second line is open circuited.

With the switch of the invention configured in this way, the switch acts not only to selectively couple signals between its ports but also to provide desired filtering in both of its configurations. In this way, the need for separate filter components is eliminated.

When used in a transmission system, the first and second ports of the switch are adapted to be coupled to the transmitter and receiver of the system, respectively. The third port, in turn, is adapted to be coupled to the system antenna. By applying a DC control signal to the switching elements, the elements can be rendered conductive and non-conductive. When conductive, the first and third ports of the switch become coupled and the second port decoupled, so that the transmitter and antenna are connected through a first preselected filter characteristic provided by the transmission lines. When non-conductive, the third and second ports of the switch are coupled and the first port decoupled, so that the antenna and receiver are coupled through a second preselected filter characteristic again provided by the transmission lines.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
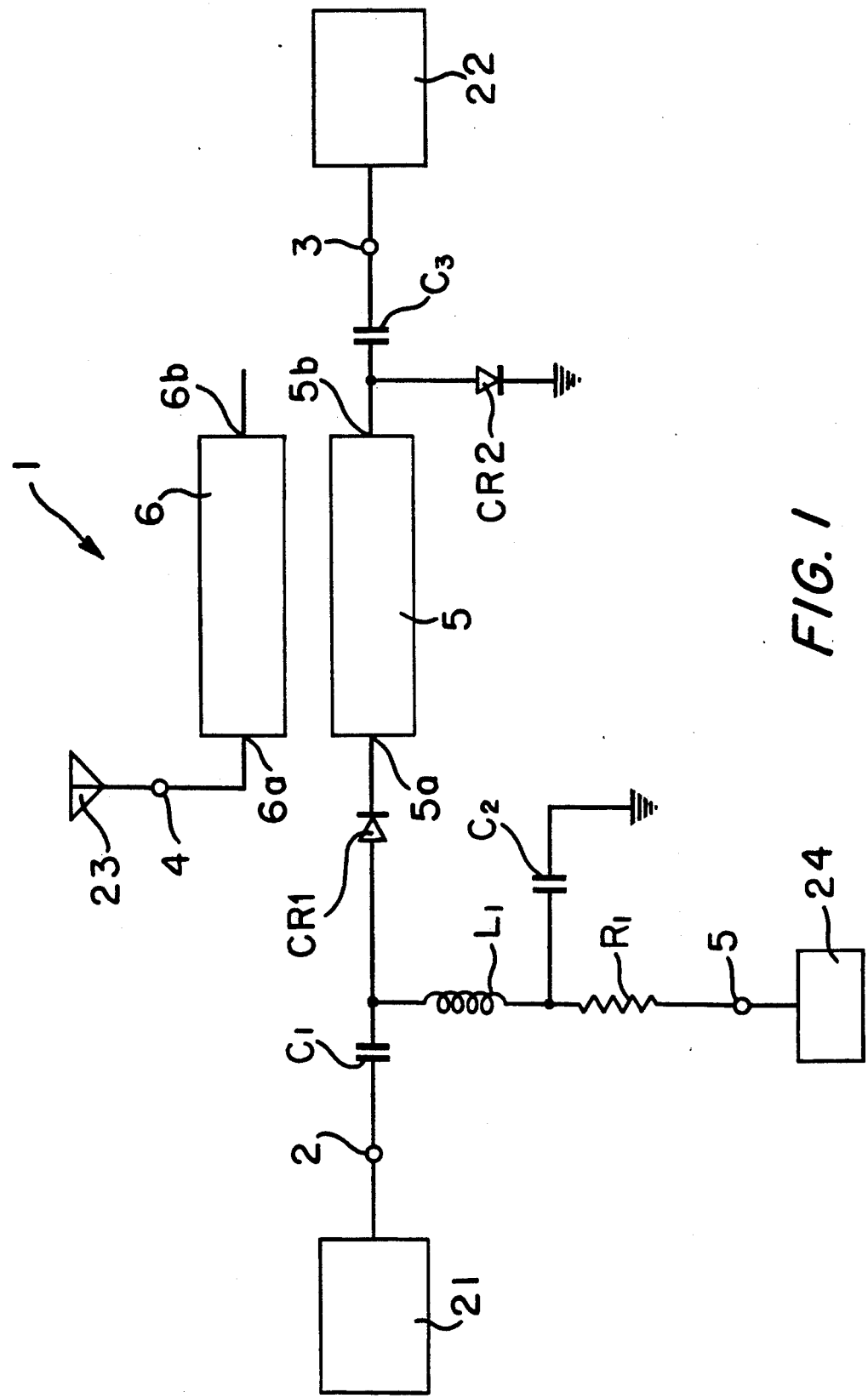
FIG. 1 shows a switch in accordance with the principles of the present invention.

In FIG. 1, a switch 1 in accordance with the principles of the present invention is illustrated. The switch 1 is to provide selective coupling between the transmitter 21, receiver 22 and antenna 23 of an RF transmission system. As shown, the transmitter 21, receiver 22 and antenna 23 are connected to ports 2, 3 and 4 of the switch 1.

The switch 1 comprises first and second coupled quarter-wave transmission line sections 5 and 6. These sections each have first and second ends, depicted as 5a, 5b and 6a, 6b, respectively in FIG. 1.

A first switching element, shown as PIN diode CR1, has its cathode connected to the end 5a of the line 5 and its anode connected to one end of a first DC blocking capacitor $C_1$. The other end of capacitor $C_1$ is connected to the port 2. The cathode of the diode CRI is also connected to an end of a series combination of an RF choke $L_1$ and a resistor $R_1$. The other end of this series combination is connected to a control port 5 of the switch 1. DC bias or control signals are applied by a signal source 24 to the port 5 for controlling operation of the switch 1. A further filtering capacitor $C_2$ is connected between the junction of the choke $L_1$ and resistor $R_1$ and ground.

A second switching element, shown as PIN diode CR2, has its cathode connected to ground and its anode connected to the end 5b of the line 5. The latter end of line 5 is also connected to one end of a blocking capacitor $C_3$ whose other end is connected to the port 3 of the switch 1.

The end 6a of the line 6 is connected to the antenna 23 through the port 4 of the switch 1. The other end 6b of the line 6 is open circuited.

With the switch 1 configured as aforesaid, the transmission lines 5 and 6 are found to exhibit bandpass filter characteristics when the switch 1 acts to couple signals between the switch ports 2 and 4 as well as between the ports 4 and 3. These bandpass filter characteristics enable the switch 1 to provide desired filtering of the signals without the need of separate filter elements. The switch 1 thus reduces the cost and size of the transmission system.

The particular bandpass filter characteristics exhibited by the switch 1 between the respective ports 2 and 4 and 4 and 3 can be controlled by varying the spacing between and the width of the lines 5 and 6 as well as other line parameters until the desired characteristics are achieved. The manner of adjusting these line parameters is well known in the art and is described in Mattheai, et al., Microwave Filters, Impedance-Matching Networks, & Coupling Structures, Artech House, 1989, ISBN 0-89006-099-1.

In operation, when a high level DC bias or control signal is applied to the port 5 by the source 24, the diodes CRI and CR2 are forward biased and brought into conduction. This causes the end 5b of the line 5 to be grounded, thereby preventing any signal from the coupled lines 5 and 6 from reaching the port 3. The receiver 22 is thus substantially decoupled from the transmitter 21 and antenna 23.

The grounded end 5b of line 5 also makes this end of the line 5 appear as an infinite or high impedance to the signals coupled to the end 5a of the line 5 through the conducting diode CRI a quarter wavelength away. Hence, signals from the transmitter 21 at the port 2 of the switch 1 are coupled to the end 6a of the line 6. These transmitter signals are therefore, delivered to the antenna 23 for transmission.

At this time, as above-noted, the coupled lines 5 and 6 with line end 5b effectively grounded also exhibit a bandpass characteristic between the line ends 5a and 6a. As a result, the transmitted signals, when passing from the port 2 to the port 4 of the switch, are simultaneously filtered in accordance with the bandpass characteristic.

When the DC bias or control signal applied to the port 5 of the switch 1 is at a low level, the diodes CR1 and CR2 are rendered non-conductive and, thus appear as high impedance or open circuits. As a result, the circuit path between port 2 of the switch and the end 5a of the line 5 is opened, thereby substantially decoupling transmitter 21 from the antenna 23. The circuit path between the end 5b of line 5 and the port 3 of the switch, on the other band, is no longer grounded, thereby placing the receiver 22 in circuit with the line 5. Signals from antenna 23 are thus now able to pass from the port 4 of the switch 1 through the lines 5 and 6 to the port 3 to be received by the receiver 22.

In this case, as above-noted, the lines 5 and 6 with line end 5a effectively open circuited also exhibit a bandpass characteristic. The signals coupled between the ports 4 and 3 are, therefore, simultaneously filtered as they are coupled.

The switch 1, thus, not only provides the necessary coupling among the transmitter 21, receiver 22 and antenna 23 at its ports 2, 3 and 4, but also provides desired filtering of the signals being coupled. As can be appreciated, the particular filter characteristics selected for the receive and transmit modes of operation of the switch 1 will depend upon each particular application. As above-indicated, these characteristics can be set by appropriately selecting the parameters of the lines using conventional design procedures as taught in Mattheai, et al. Also, when designing the switch 1, the switch should be optimized for bandwidth, center frequency, return loss, isolation and insertion loss of both states taking into account any parasitic losses of the switching elements and physical realisation of the coupled line sections.

It should also be noted that, in addition to the filtering advantage provided by the coupled lines 5 and 6, these lines also advantageously act as a DC blocking element for the port 4 and, thus, antenna 23. Moreover, the use of the line 6 in the switch 1 provides negligible additional loss to the switch since line 5 is needed anyway.

In all cases it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, for example, switching elements other than the PIN diodes CRI and CR2 may be used in the switch 1.

What is claimed is:

1. A combined switch and filter responsive to a control signal comprising:

first, second and third ports;

first and second electromagnetically coupled quarter-wave transmission line sections, said first transmission line section having first and second ends and said second transmission line section having a first end electrically coupled to said third port and a second end which is open circuited;

first and second electrical means responsive to said control signal for electrically coupling said first and second ends of said first transmission line section to said first and second ports, respectively, said first electrical means including a first switching element responsive to said control signal and connected between said first port and said first end of said first transmission line section and said second electrical means including a second switching element responsive to said control signal and connected between said second end of said first transmission line section and ground;

and said first and second transmission line sections selected to provide filtering of signals coupled between said first and third ports and said second and third ports of said switch, respectively.

2. A combined switch and filter in accordance with claim 1 further comprising:

a control port, electrically coupled to said first electrical means, for receiving said control signal and applying said control signal to said first electrical means.

3. A combined switch and filter in accordance with claim 1 wherein:

said first switching element comprises a first diode having a cathode electrically coupled to said first end of said first transmission line section and an anode electrically coupled to said first port;

and said second switching element comprises a second diode having an anode electrically coupled to said second end of said first transmission line section and a cathode electrically coupled to ground.

4. A combined switch and filter in accordance with claim 3 further comprising:

a control port for receiving said control signal; and third electrical means electrically coupling said control port to said first electrical means for applying said control signal received by said control port to said first electrical means.

5. A combined switch and filter in accordance with claim 4 wherein:

said first electrical means further comprises: a first capacitor having a first end connected to the anode of said first diode and a second end connected to said first port; and said third electrical means comprises an RF choke having a first end connected to the anode of said first diode and a second end electrically coupled to said signal control port;

and said second electrical means further comprises: a second capacitor having a first end connected to said second end of said first transmission line section and a second end connected to said second port.

6. A combined switch and filter in accordance with claim 5 wherein:

said third electrical means further comprises a resistor having one end connected to said second end of said RF choke and a second end connected to said control port;

and said first electrical means further comprises a third capacitor having one end connected to the second end of said RF choke and a second end connected to ground.

7. In combination:
an antenna;
a transmitter;
a receiver;
a combined switch and filter for providing coupling among said antenna, transmitter and receiver in response to a control signal comprising: first, second and third ports connected to said transmitter, receiver and antenna, respectively; first and second electromagnetically coupled quarter-wave transmission line sections, said first transmission line section having first and second ends and said second transmission line section having a first end electrically coupled to said third port and a second end which is open circuited; first and second electrical means responsive to said control signal for electrically coupling said first and second ends of said first transmission line section to said first and second ports, respectively, said first electrical means including a first switching element responsive to said control signal and connected between said first port and said first end of said first transmission line section and said second electrical means including a second switching element responsive to said control signal and connected between said second end of said first transmission line and ground; and said first and second transmission line sections selected to provide filtering of signals coupled between said first and third ports and said second and third ports of said switch, respectively.

8. The combination of claim 7 wherein:

said combined switch and filter further comprises: a control port, electrically coupled to said first and second electrical means, for receiving said control signal and applying said control signal to said first electrical means.

9. The combination of claim 7 wherein:

said first switching element comprises: a first diode having a cathode electrically coupled to said first end of said first transmission line section and an anode electrically coupled to said first port;

and said second switching element further comprises: a second diode having an anode electrically coupled to said second end of said first transmission line section and a cathode electrically coupled to ground.

10. The combination of claim 9 wherein:

said switch and filter further comprises: a control port for receiving said control signal; and third electrical means electrically coupling said control port to said first electrical means for applying said control signal received by said control port to said first electrical means.

11. The combination of claim 10 wherein:

said first electrical means further comprises: a first capacitor having a first end connected to the anode of said first diode and a second end connected to said first port; and said third electrical means comprises an RF choke having a first end connected to the anode of said first diode and a second end electrically coupled to said signal control port;

and said second electrical means further comprises: a second capacitor having a first end connected to said second end of said first transmission line section and a second end connected to said second port.

12. The combination of claim 11 wherein:

said third electrical means further comprises a resistor having one end connected to said second end of said RF choke and a second end connected to said control port;

and said first electrical means further comprises a third capacitor having one end connected to the second end of said RF choke and a second end connected to ground.

* * * * *